March 21, 1961  R. G. PIETY  2,976,106
SEISMIC SIGNAL RECORDING APPARATUS
Filed Jan. 23, 1956  3 Sheets-Sheet 1

INVENTOR.
R. G. PIETY
BY Hudson & Young
ATTORNEYS

March 21, 1961   R. G. PIETY   2,976,106
SEISMIC SIGNAL RECORDING APPARATUS
Filed Jan. 23, 1956   3 Sheets-Sheet 2

INVENTOR.
R. G. PIETY
BY
Hudson & Young
ATTORNEYS

March 21, 1961  R. G. PIETY  2,976,106
SEISMIC SIGNAL RECORDING APPARATUS
Filed Jan. 23, 1956  3 Sheets-Sheet 3

INVENTOR.
R.G. PIETY
BY *Hudson & Young*
ATTORNEYS

United States Patent Office 2,976,106
Patented Mar. 21, 1961

2,976,106
SEISMIC SIGNAL RECORDING APPARATUS

Raymond G. Piety, Bartlesville, Okla., assignor to Phillips Petroleum Company, a corporation of Delaware Filed Jan. 23, 1956, Ser. No. 560,848

11 Claims. (Cl. 346—109)

This invention relates to the recording and interpretation of seismic records.

Seismic exploration refers to a method of obtaining information regarding subterranean formations by transmitting vibrations from a first point at or near the surface of the earth downwardly into the formations and measuring the reflected vibrations at one or more second points spaced from the first point. It is common practice to detonate an explosive charge to produce the vibrations. A plurality of vibration responsive seismometers are disposed in a predetermined geometric array in spaced relationship from the shot hole. The vibrations incident upon the seismometer are converted into corresponding electrical signals which are amplified and recorded. By measuring the travel times of selected vibrations, valuable information can be obtained regarding the depth and slope of subterranean reflecting formations. Unfortunately, extraneous vibrations normally are present which tend to obscure the desired reflected signals. Also, it is difficult to locate common reflections from signals received at different seismometers because of the difference in travel times of the vibrations to the spaced seismometers.

In accordance with the present invention vibrations received at a plurality of seismometers are recorded in such a manner that reflections from common beds appear adjacent to one another on the recording medium. In a specific embodiment of the invention this is accomplished by the use of a pair of mirror-supporting galvanometers which are mounted so that the two mirrors rotate about axes at right angles to one another. A beam of light is reflected from the first mirror to the second mirror and then to a film which is moved relative to the galvanometers. The output of a seismometer is applied to the galvanometer which displaces the light beam laterally on the film. A bias voltage is applied to the second galvanometer to displease the light beam longitudinally of the film. This bias voltage is varied during the recording procedure so that traces from the individual seismometers are displaced in such a manner that reflections from common beds appear adjacent one another on the film. An adjustable potentiometer network is provided to supply the bias voltage to the second galvanometer.

Accordingly, it is an object of this invention to provide improved apparatus for recording seismic signals.

Another object is to provide apparatus for recording signals from a plurality of seismometers adjacent one another on a common recording medium in such a manner that reflections from common beds appear side by side.

Other objects, advantages and features of the invention should become apparent from the following detailed description taken in conjunction with the accompanying drawing in which.

Figure 1:
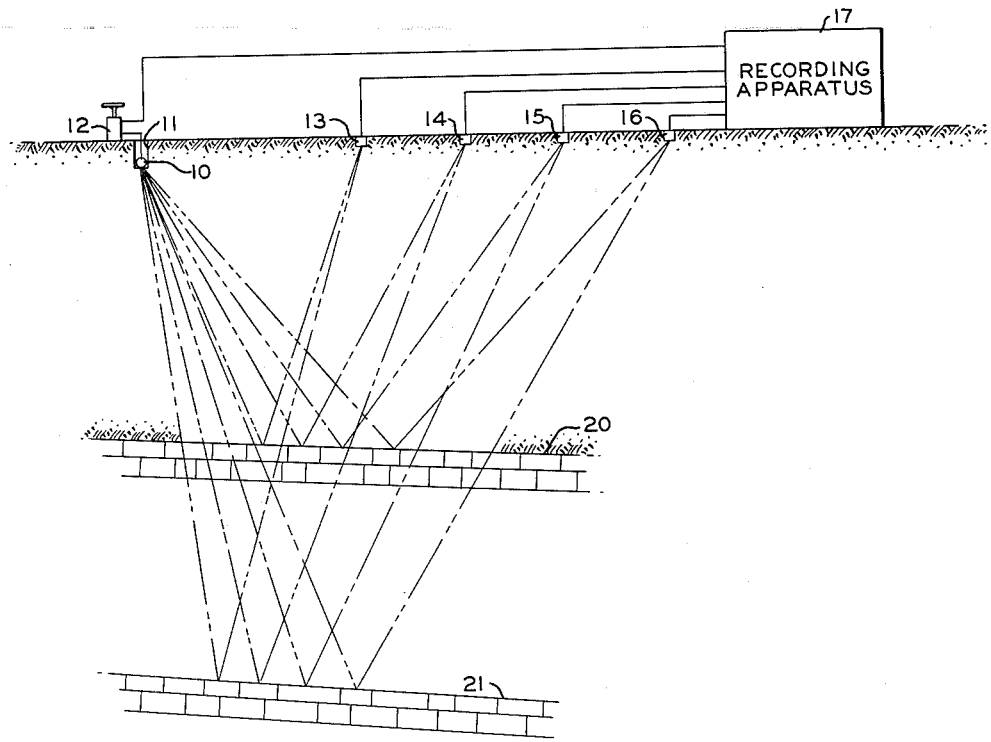
Figure 1 is a schematic representation of a typical seismic exploration system.

Referring now to the drawing in detail and to Figure 1 in particular, there is shown a schematic representation of apparatus commonly employed in seismic exploration. Vibrations are established at a first point near the surface of the earth by detonating an explosive charge 10 in a shot hole 11. This is accomplished by means of a detonator 12 at the surface. A plurality of seismometers 13, 14, 15 and 16 are positioned near the surface in spaced relationship with shot hole 11. These seismometers can represent individual vibration responsive transducing elements or they can represent a plurality of such elements grouped together, as is conventional in the seismic exploration art. The seismometers are of the type which convert mechanical vibrations incident thereon into corresponding electrical signals. These signals are applied to respective input channels of recording apparatus 17. Vibrations emitted from explosive charge 10 travel downwardly into the earth and are reflected from subterranean formations, such as indicated at 20 and 21. The vibrations reflected from these formations are received by the seismometers at the surface. Detonator 12 also generates an electrical timing pulse which is applied to recording apparatus 17.

Figure 2:
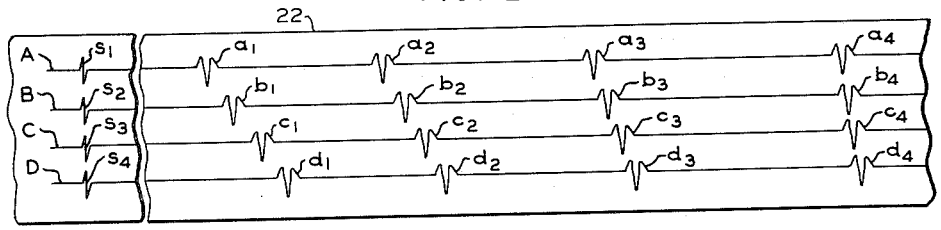
Figure 2 is a schematic representation of a typical seismic record produced by conventional recording apparatus.

Figure 2 is a schematic representation of the type of signal produced by conventional recording apparatus wherein the output of each seismometer is applied to a respective channel of a multichannel recorder. The vibrations received by seismometers 13, 14, 15 and 16 are represented schematically by respective traces A, B, C and D on a photographic film 22. The points $s_1$, $s_2$, $s_3$ and $s_4$ represent the time of detonation of charge 10. Points $a_1$ and $a_2$ on trace A represent reflections from respective formations 20 and 21. Points $a_3$ and $a_4$ represent reflections from lower beds, not shown in Figure 1. From an inspection of Figures 1 and 2 it should be evident that the first reflections received at seismometer 13 arrive earlier than do the first reflections which are received at seismometer 14. This is because the vibrations received by seismometer 14 travel a greater distance than do the vibrations received by seismometer 13. However, this difference in time becomes progressively smaller as vibrations are received from beds at greater depths. In accordance with the present invention, the reflections from common reflecting beds are recorded adjacent one another on a photgoraphic film.

Figure 3:
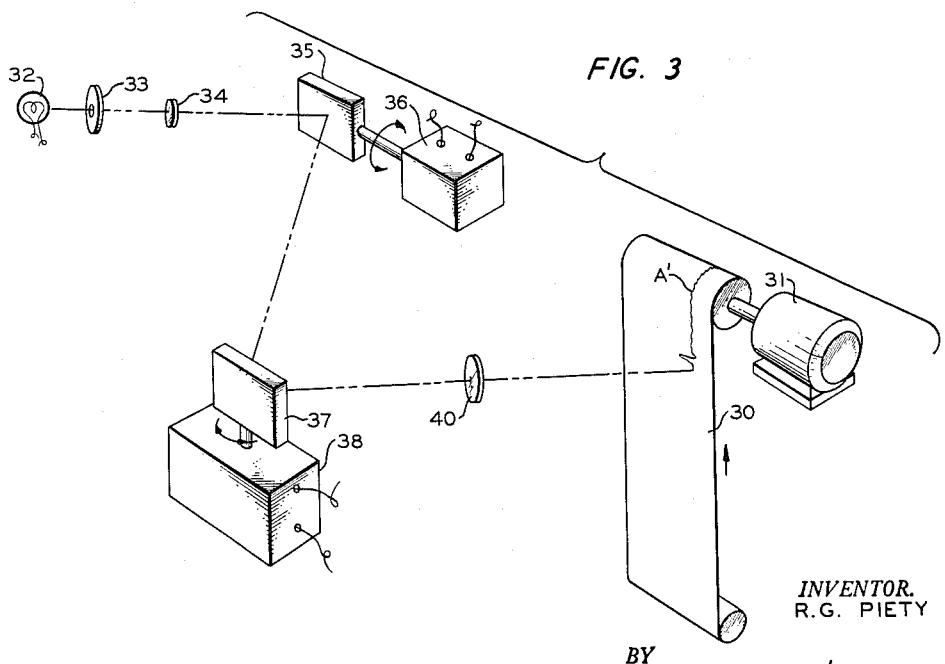
Figure 3 is a schematic representation of the photographic recording apparatus of this invention.

Referring now to Figure 3, there is shown a recording system having a photographic film 30 which is moved at a predetermined speed by means of a motor 31. Film 30 is exposed by a beam of light being reflected thereon. This beam is produced by a lamp 32. Radiation from lamp 32 passes through an apertured plate 33 and a collimating lens 34 to a rotatable mirror 35 of a first galvanometer 36. The beam is reflected from mirror 35 to the rotatable mirror 37 of a second galvanometer 38. The beam is reflected from mirror 37 and focused by a lens 40 on film 30. The exposure of film 30 by this beam of light forms a trace A' which represents the reflections received at seismometer 13. The output signal of seismometer 13 is amplified, if desired or required, and applied to galvanometer 38. The magnitude of this signal determines the lateral displacement of the light beam on film 30.

It should be noted that the axes of rotation of galvanometer mirrors 35 and 37 are at right angles to one another. Thus, rotation of mirror 35 displaces the radiation beam longitudinally of film 30. Although only a single pair of galvanometers is shown in Figure 3, it should be evident that additional galvanometers are provided for each seismometer employed. This results in additional traces B', C' and D', not shown, being formed on film 30.

Figure 4:
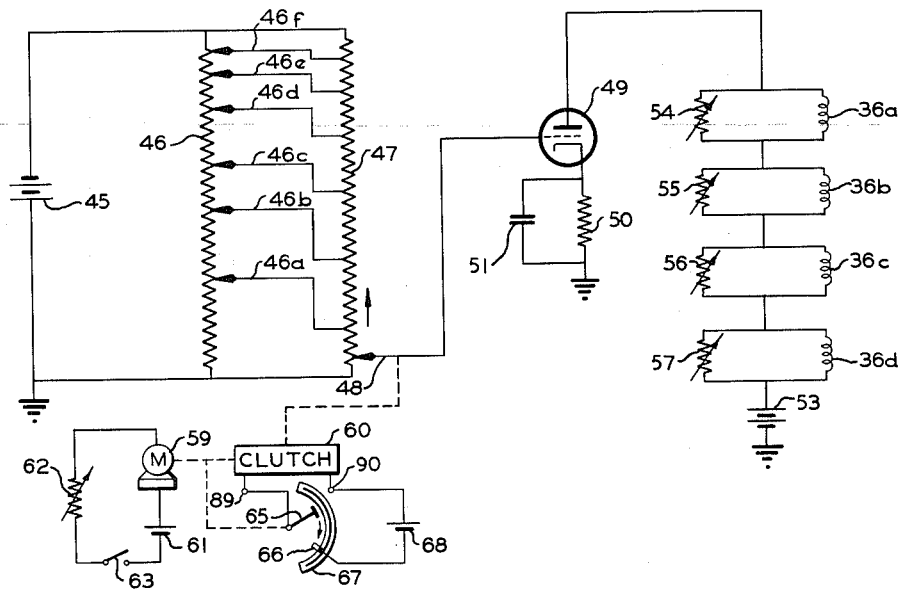
Figure 4 is a schematic representation of the electrical components of the recording apparatus.

The electrical apparatus employed to energize galvanometer 36 is illustrated in Figure 4. A voltage source 45 is applied across a pair of parallel connected potential dividing networks 46 and 47. A plurality of adjustable arms 46a, 46b, 46c, 46d, 46e and 46f are connected between the two networks. A single contactor 48 is movable along network 47. Contactor 48 is connected to the control grid of a triode 49. The cathode of triode 49 is connected to ground through a resistor 50 which is shunted by a capacitor 51. The anode of triode 49 is connected to the positive terminal of a potential source 53 through series connected galvanometer coils 36a, 36b, 36c and 36d. The negative terminal of potential source 53 is connected to ground. Coil 36a represents the coil of galvanometer 36. The remaining galvanometer coils represent the coils of corresponding galvanometers which are provided in the apparatus of Figure 3 to produce the additional traces on film 30. Variable resistors 54, 55, 56 and 57 are connected in parallel with respective galvanometer coils 36a, 36b, 36c and 36d.

The drive shaft of a motor 59 is connected through a clutch 60 to contact arm 48. A current source 61, a variable resistor 62 and a switch 63 are connected in circuit with motor 59. Switch 63 is connected so as to be closed by the operation of detonator 12. This energizes motor 59 to rotate a switch arm 65. A stationary contact 66 is adjustably mounted on a calibrated frame 67 so as to be engaged by switch arm 65 at a predetermined time interval following closure of switch 63. Engagement of switch arm 65 with contact 66 completes a circuit between a current source 68 and clutch 60. This actuates clutch 60 so that further rotation of motor 59 moves switch arm 48 along potential divider 47. Clutch 60 can be of the magnetic type and is provided with suitable latching means so as to remain actuated once the circuit with battery 68 is closed initially.

Figure 5:
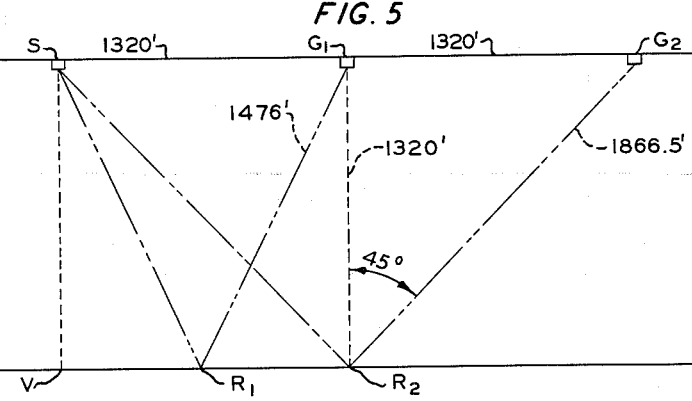
Figure 5 is a schematic representation of the operating principles of this invention.

The operation of the time delay apparatus of this invention can be explained in conjunction with Figure 5. Reference character S represents the shot point at the surface of the earth. Reference characters $G_1$ and $G_2$ represent the locations of seismometers 13 and 16, for example. For purposes of discussion, it is assumed that point $G_1$ is 1320 feet from point S and point $G_2$ is 1320 feet from point $G_1$. It is also assumed that a horizontal reflecting bed occurs at a depth of 1320 feet. This results in the reflections from point S to point $G_2$ striking a point $R_2$ on the reflecting bed such that the incident and reflected vibrations make angles of 45° with the reflecting bed. It is also assumed that the vibrations are transmitted at a velocity of 10,000 feet per second in the region above the illustrated reflecting bed. Under this assumption, vibrations travel horizontally through the earth from point S to point $G_2$ at a velocity of 10,000 feet per second so that initial vibrations received at point $G_2$ occur 0.264 second after detonation of the charge at point S. Vibrations travel from point S to point V and back in 0.264 second. Vibrations travel from point S to point $R_1$ to point $G_1$ in 0.295 second. Vibrations travel from point S to point $R_2$ to point $G_2$ in 0.373 second. The difference in travel times of the vibrations received at points $G_2$ and $G_1$ is thus 0.078 second.

With reference to Figure 2 it can be seen that the corresponding reflections for the four traces can be aligned in one of two manners. The reflections $a_1$, $b_1$ and $c_1$ can be displaced respective amounts to the right to be adjacent reflection $d_1$, or reflections $b_1$, $c_1$ and $d_1$ can be displaced respective amounts to the left to be adjacent reflection $a_1$. The circuit of Figure 4 provides the first-mentioned displacements. The circuit is adjusted so that the initial current through galvanometer coil 36a displaces the light beam in a direction and by an amount so that reflection $a_1$ in the record of Figure 2 occurs at the same time as the reflection $d_1$. In the illustrated series connected circuit it is impossible to eliminate entirely the current through galvanometer coil 36d. Therefore, the relative currents are adjusted so that the deflections resulting from galvanometer coil 36a is moved to the right an additional amount equal to the deflection by galvanometer coil 36d. The currents through galvanometer coils 36b and 36c are similarly adjusted so that the four reflections occur at the same point on the photographic film. At the first part of the record potentiometer contactor 48 is near the grounded terminal of network 47 so that conduction through triode 49 and the galvanometer coils is a maximum. The relative currents through the coils are adjusted by resistors 54, 55, 56 and 57.

From an inspection of Figures 1 and 2 it can be seen that several reflections from the second bed 21 occur at more nearly the same time than do the corresponding reflections from bed 20. Thus, each of the reflections $a_2$, $b_2$ and $c_2$ in Figure 2 must be displaced a smaller amount than the corresponding first reflections. This is accomplished by moving potentiometer contact 48 upwardly to apply a more negative bias potential to the control grid of triode 49. This reduces the current through the triode and the galvanometer coils to decrease the displacement of the corresponding light beams. In like manner, the third and fourth groups of reflections are displaced still smaller amounts by the upward movement of contactor 49.

A factor which must be considered in calibrating the apparatus is the increase in velocity of the seismic vibrations at progressively lower depths in the earth. The velocity profile normally is obtained by firing one or more shots in a drill hole at different depths and measuring the times required for the vibrations to travel to the surface of the earth. The speed of motor 59 is set in accordance with the increased velocity of the vibrations at lower depths. The geometrical spread of the seismometers determines the difference in travel times of vibrations received at the several seismometers. The difference becomes less as reflections are received at lower depths. The connectors 46a, 46b, 46c, 46d, 46e and 46f are set to accommodate this spread. These connectors are generally equally spaced on network 47 to provide smooth adjustment. Contact 66 is set to start the correction before the first reflection arrives at the seismometers.

Figure 6:
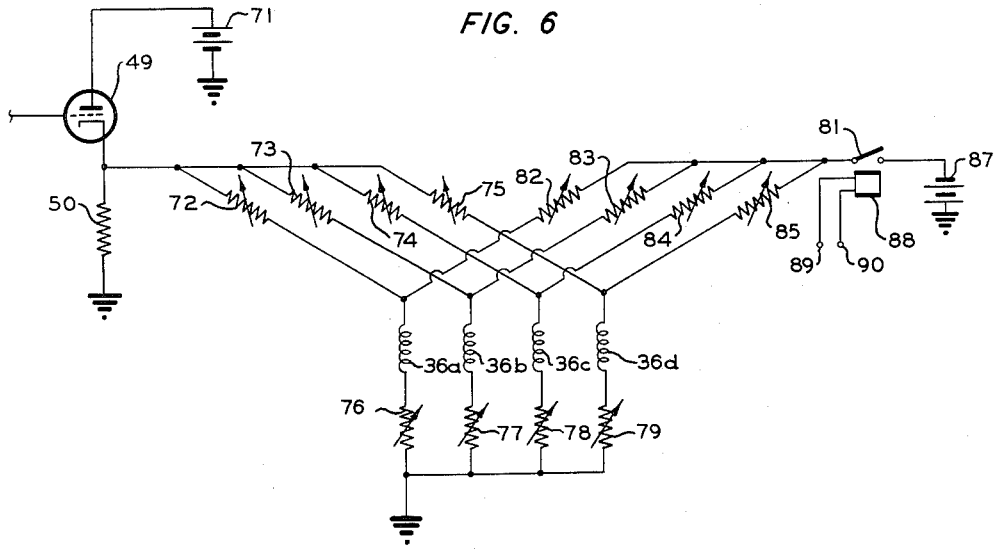
Figure 6 is a schematic circuit diagram of a second embodiment of the electrical components of the recording apparatus.

In Figure 6 there is shown a second embodiment of the electrical components of the recording apparatus of this invention. The anode of triode 49 is connected to the positive terminal of a voltage source 71. The negative terminal of voltage source 71 is connected to ground. The cathode of triode 49 is connected through variable resistors 72, 73, 74 and 75 to the first terminals of galvanometer coils 36a, 36b, 36c and 36d, respectively. The second terminals of these coils are connected to ground through respective variable resistors 76, 77, 78 and 79. The first terminals of galvanometer coils 36a, 36b, 36c and 36d are connected to a switch 81 through respective variable resistors 82, 83, 84 ad 85. The stationary contact of switch 81 is connected to the negative terminal of a voltage source 87. The positive terminal of voltage source 87 is connected to ground. Switch 81 is closed by a relay coil 88 being energized. The terminals 89 and 90 of coil 88 are connected to the respective input terminals of clutch 60. This results in switch 81 being closed at the same time clutch 60 is energized.

Switch 81 is the type which remains closed after coil 88 is initially energized.

The circuit of Figure 6 is adapted to displace the b, c and d reflections in the record of Figure 2 toward the left so as to be aligned with the corresponding a reflections. Obviously, this cannot be accomplished directly because the light beam would retrace a portion of the record if displaced in this direction. However, the circuit of Figure 6 provides a bias potential 87 which displaces all of the reflections toward the right by a predetermined amount and then displaces each reflection to the left by an amount sufficient to produce the desired alignment. This bias potential is applied to the coils in opposition to the potential supplied from triode 49. It should be evident that as potentiometer contact 48 moves upwardly to decrease the conduction by triode 49, the potential at the anode thereof increases to increase the displacement of the individual galvanometer mirrors. Otherwise, the operation of the circuit of Figure 6 is the same as that of the circuit of Figure 4. The relative currents through the galvanometer coils are adjusted by the variable resistors in circuit therewith.

In view of the foregoing description it should be evident that there is provided in accordance with this invention improved apparatus for recording seismic signals so that reflections received from a plurality of seismometers are positioned adjacent one another on the recording medium. While the invention has been described in conjuction with present preferred embodiments, it should be evident that it is not limited thereto.

What is claimed is:

1. Apparatus for recording seismic signals so that signals from a reflecting surface appear side by side one another on the recording medium comprising a photographic film, a light source, first and second mirror-supporting galvanometers positioned with respect to one another and to said source and said film so that a beam of light from said source is reflected from the mirror of said first galvanometer to the mirror of said second galvanometer and to said film, the axes of rotation of the mirrors of said galvanometers being at right angles to one another, and means to move said film relative to said galvanometers and said light source so that said beam is deflected perpendicular to the direction of movement by rotation of the mirror of one of said galvanometers and is deflected parallel to the direction of movement by rotation of the mirror of the other of said galvanometers, said one galvanometer being connected to a seismometer to deflet the light beam in accordance with the signal to be recorded, and said other galvanometer being connected to a means to supply a direct current bias to deflect the light beam parallel to the direction of movement of said film so that corresponding signals appear side by side one another on said film.

2. Apparatus for recording seismic signals so that reflections received from a plurality of seismometers are positioned side by side one another on the recording medium comprising a photographic film, a plurality of light sources, a plurality of first mirror-supporting galvanometers, a plurality of second mirror-supporting galvanometers, said light sources and galvanometers being positioned with respect to one another and with said film so that a beam of light from each of said sources is reflected from the mirror of a respective first one of said galvanometers to the mirror of a respective second one of said galvanometers and to said film, the axes of rotation of the mirrors of said first galvanometers being at right angles to the axes of rotation of the mirrors of said second galvanometers, said galvanometers being positioned relative to one another so that the beams of light appear side by side on said film, and means to move said film relative to said galvanometers so that said beams are deflected generally perpendicular to the direction of movement by rotation of the mirrors of said second galvanometers, means to supply direct bias currents to said first galvanometers to displace the light beams parallel to the direction of movement of said film so that corresponding signals appear side by side one another on said film, said second galvanometers being connected to seismometers to deflect the light beams in accordance with the signals to be recorded.

3. Apparatus according to claim 1 wherein said last-mentioned means is adapted to supply to said other galvanometer a direct current bias which varies in accordance with a predetermined time relationship.

4. Apparatus suitable for utilization in recording seismic signals wherein it is desired that reflections received from a plurality of seismometers be positioned side by side one another on the recording medium comprising a photographic film, a light source, first and second mirror-supporting galvanometers positioned with respect to one another and to said source and said film so that a beam of light from said source is reflected from the mirror of said first galvanometer to the mirror of said second galvanometer and to said film, the axes of rotation of the mirrors of said galvanometers being at right angles to one another, and means to move said film relative to said galvanometers and said light source so that said beam is deflected perpendicular to the direction of movement by rotation of the mirror of one of said galvanometers and is deflected parallel to the direction of movement by rotation of the mirror of the other of said galvanometers, said one galvanometer being connected to a signal source to deflect the light beam in accordance with the signal to be recorded and said other of said galvanometer being connected to bias means to displace the light beam parallel to the direction of movement of said film so that corresponding signals appear side by side one another on said film, said bias means comprising means to produce a bias voltage which varies in accordance with a predetermined time relationship.

5. The combination in accordance with claim 1 wherein said means to supply a bias current comprises a potential dividing network, a direct voltage source applied across said network, a contactor, a motor connected to said contactor to move same along said network at a predetermined speed, and circuit means connecting the contactor and one terminal of said network to said other galvanometer.

6. The combination in accordance with claim 5 wherein said network comprises a first resistance element having said voltage source applied across the end terminals thereof, a second resistance element having said contactor in engagement therewith, and a plurality of conductors connected between said resistance elements in spaced relationship with one another.

7. The combination in accordance with claim 2 wherein said means to supply a direct bias current comprises a potential dividing network, a direct voltage source applied across said network, a contactor, a motor connected to said contactor to move same along said network at a predetermined speed, and circuit means connecting the contactor and one terminal of said network to said first galvanometers.

8. The combination in accordance with claim 7 wherein said network comprises a first resistance element having said voltage source applied across the end terminals thereof, a second resistance element having said contactor in engagement therewith, and a plurality of conductors connected between said resistance elements in spaced relationship with one another.

9. The combination in accordance with claim 7 wherein the coils of said first galvanometers are connected in series relationship, an adjustable resistor connected in parallel with the coils of each of said first galvanometers, and wherein said circuit means comprises means responsive to the potential between the contactor and said one terminal of said network to direct successively less current through the coils of said first galvanometer as said contactor moves along said network.

10. The combination in accordance with claim 7 wherein said circuit means comprises means responsive to the potential between the contactor and said one terminal of said network to establish a first voltage which decreases in amplitude as said contactor moves along said network, means applying said first voltage across the coils of said first galvanometers, and means applying a second voltage across the coils of said first galvanometers to tend to pass current through the coils of said first galvanometers in a direction opposite the direction current tends to flow from said first voltage.

11. The combination in accordance with claim 7 wherein said circuit means comprises a vacuum tube having a cathode, an anode and a control grid, said contactor is connected to said control grid, said one terminal of said network is connected to a reference potential, a first resistor connected between said cathode and said reference potential, means applying a potential to said anode which is positive with respect to said reference potential, a plurality of second variable resistors connected between said cathode and respective first terminals of the coils of said first galvanometers, a plurality of third variable resistors connected between said reference potential and respective second terminals of the coils of said first galvanometers, a second voltage source having one terminal connected to said reference potential, a plurality of fourth variable resistors, and means connecting said fourth resistors between the second terminal of said second voltage source and said first terminals of respective ones of the coils of said first galvanometers.

References Cited in the file of this patent

UNITED STATES PATENTS

| | | |
|---|---|---|
| 1,901,876 | Lehde | Mar. 21, 1933 |
| 2,267,356 | Ritzmann | Dec. 23, 1941 |
| 2,687,338 | Davis | Aug. 24, 1954 |
| 2,440,970 | Palmer | May 4, 1958 |

FOREIGN PATENTS

| | | |
|---|---|---|
| 899,361 | France | May 29, 1945 |